US006236545B1

United States Patent
McDougall et al.

(10) Patent No.: US 6,236,545 B1
(45) Date of Patent: May 22, 2001

(54) CURRENT LIMITING DEVICE UTILIZING A SUPERCONDUCTOR

(75) Inventors: Ian Leitch McDougall, Oxon; Peter Hanley, Gloucestershire, both of (GB)

(73) Assignee: Oxford Instruments PLC, Oxon (GB)

( * ) Notice: Subject to any disclaimer, the term of this patent is extended or adjusted under 35 U.S.C. 154(b) by 0 days.

(21) Appl. No.: 08/882,496

(22) Filed: Jun. 25, 1997

(30) Foreign Application Priority Data

Jun. 25, 1996 (GB) .................................................. 9613266

(51) Int. Cl.[7] .................................................... H02H 3/02
(52) U.S. Cl. .......................... 361/19; 361/141; 361/93.9
(58) Field of Search ................. 361/19, 58, 93, 361/99, 86, 141, 187, 93.9

(56) References Cited

U.S. PATENT DOCUMENTS

| | | | |
|---|---|---|---|
| 3,141,979 | 7/1964 | Rinia et al. | 307/88.5 |
| 3,308,310 | 3/1967 | Burnett | 307/88.5 |
| 3,324,436 | 6/1967 | Mueller | 338/32 |
| 3,394,335 | 7/1968 | Buchhold | 338/32 |
| 3,488,617 | 1/1970 | Dietrich et al. | 338/32 |
| 3,703,664 | * 11/1972 | Cronin | 317/20 |
| 3,925,707 | * 12/1975 | Bhate et al. | 361/3 |
| 4,375,659 | * 3/1983 | Cunningham et al. | 361/19 |
| 4,700,257 | 10/1987 | Bekhaled | 361/19 |
| 4,855,859 | * 8/1989 | Tixandor et al. | 361/19 |
| 5,021,914 | * 6/1991 | Tsurunaga et al. | 361/19 |
| 5,153,803 | * 10/1992 | Rapeaux et al. | 361/19 |
| 5,179,342 | * 1/1993 | Wolfe et al. | 324/533 |
| 5,241,447 | * 8/1993 | Barber et al. | 361/141 |
| 5,379,020 | * 1/1995 | Meier et al. | 505/211 |
| 5,414,586 | * 5/1995 | Hara et al. | 361/19 |
| 5,475,560 | * 12/1995 | Onishi et al. | 361/141 |
| 5,546,261 | * 8/1996 | Yoshida et al. | 361/19 |

FOREIGN PATENT DOCUMENTS

| | | |
|---|---|---|
| 0 205 924 | 12/1986 | (EP) . |
| 0 285 513 | 10/1988 | (EP) . |
| 0 499 429 | 8/1992 | (EP) . |
| 1 567 336 | 5/1969 | (FR) . |
| 2 691 591 | 11/1993 | (FR) . |
| 1230579 | 5/1971 | (GB) . |
| 1 236 082 | 6/1971 | (GB) . |
| 1-185128 | 7/1989 | (JP) . |
| 1-206834 | 8/1989 | (JP) . |
| WO 94/03955 | 2/1994 | (WO) . |
| WO 96/30990 * | 3/1996 | (WO) .............................. H02H/9/02 |

OTHER PUBLICATIONS

Abstract of Japan, vol. 013, No. 429 (E–823), Sep. 25, 1989 & JP 01 159921 A (Toshiba Corp), Jun. 22, 1989.

U.S. application No. 08/737,080, McDougall et al., filed Oct. 30, 1996, Oxford Instruments PLC.

* cited by examiner

Primary Examiner—Michael J. Sherry
Assistant Examiner—Kim Huynh (57) ABSTRACT

A current limiting device comprises a first superconducting element for connection in an electrical circuit. The superconducting element has a critical current density. A second superconducting element detects the onset of a fault condition. A coil is responsive to the second superconducting element to vary the relationship between the critical current density and the current carried by the first superconducting element so that the element transforms into a resistive state.

10 Claims, 9 Drawing Sheets

800µH COIL, 20µF CAP AT 100kV

Fig.11.

CURRENT THROUGH 60µH COIL, FROM 4µF CAP AT 100kV, WITH 100R IN SERIES

Fig. 14. COIL CURRENT-40Ω LOAD/10Ω FAULT AT 50ms

Fig. 15. COIL CURRENT-40Ω LOAD/15Ω FAULT AT 50ms

Fig. 16. COIL CURRENT-40Ω LOAD/20Ω FAULT AT 50ms

CURRENT LIMITING DEVICE UTILIZING A SUPERCONDUCTOR

FIELD OF THE INVENTION

The invention relates to a current limiting device of the kind comprising a superconducting element for connection in an electrical circuit, the superconducting element having a critical current density.

DESCRIPTION OF THE PRIOR ART

Current limiting devices of the kind described known as fault current limiters (FCL) have been recently proposed and we describe some examples in WO-A-96/30990. In a typical example, a length of high temperature (HTc) superconductor is placed into the circuit carrying the current. HTc materials have a critical temperature which is relatively high (typically equivalent to a liquid nitrogen temperature) and have a critical current (strictly current density) which varies inversely with an applied magnetic field. If the current carried by the superconductor exceeds the critical current then the material of the conductor makes a transition to a resistive state which acts to limit the current being carried. The critical current value at which this transition occurs can be changed by changing the applied magnetic field.

In WO-A-96/30990, we describe a way of resetting such a current limiting device after the superconductor has transformed into a resistive state.

We have recently been investigating the process during which a superconducting element converts from its superconducting state to its resistive state. We have found that the change is progressive along the length of the superconducting element due to constraints in heat conductive properties of the element and in some cases could result in the generation of very high power densities within the element and possible failure of the device.

We set out below our analysis:

The following symbols are used with typical values:

| | | |
|---|---|---|
| $\rho$ | resistivity | $10^{-6}$ $\Omega$-m |
| K | thermal conductivity | 0.5 $Wm^{-1}K^{-1}$ |
| $C_p$ | specific heat | 150 $Jkg^{-1}K^{-1}$ |
| $\gamma$ | density | 6300 $kgm^{-3}$ |
| h | heat transfer to coolant | 200 $Wm^{-2}K^{-1}$ |
| $\theta_0$ | coolant temperature | 77 K. |
| $\theta_c$ | superconducting critical temperature | 90 K. |
| $\theta_{max}$ | maximum safe temperature | 800 K. |
| $\theta$ | temperature variable | |
| J, $J_c$ | current density, critical current density | |
| $\delta$ | width of the superconducting transition | |
| $I_{max}, I_f$ | trip current, limited current | |
| $R_0$ | nominal normal-state resistance | |
| L, A | length, cross-sectional area | |

For a "series resistor" type of FCL system:

$$I_{max} = J_c A \quad \text{(peak)}$$

$$I_f = \frac{V}{\rho L/A}$$

$$\frac{I_f}{I_{max}} = \frac{V}{\rho J_c L}$$

Thermal diffusivity $$m = \frac{K}{\gamma C_p} = 5.3 \, 10^{-7} \, ms^{-1}$$

This implies that in 0.01 s, a thermal disturbance will travel only 5 nanometres. We can therefore ignore the AC heating effect of the supply current, and use the appropriate RMS value in thermal calculations.

If we consider an HTC element consisting of a slab or a film, with one face cooled, then under normal-state conditions, the temperature distribution is described by:

$$K\frac{\partial^2 \theta}{\partial x^2} - \gamma C_p \frac{\partial \theta}{\partial t} = \frac{J^2 \rho}{2}$$

At x=0, the heat flow is $$Q = h(\theta - \theta_0)$$

and at $t=0, \theta=\theta_0$ everywhere.

Figure 1:
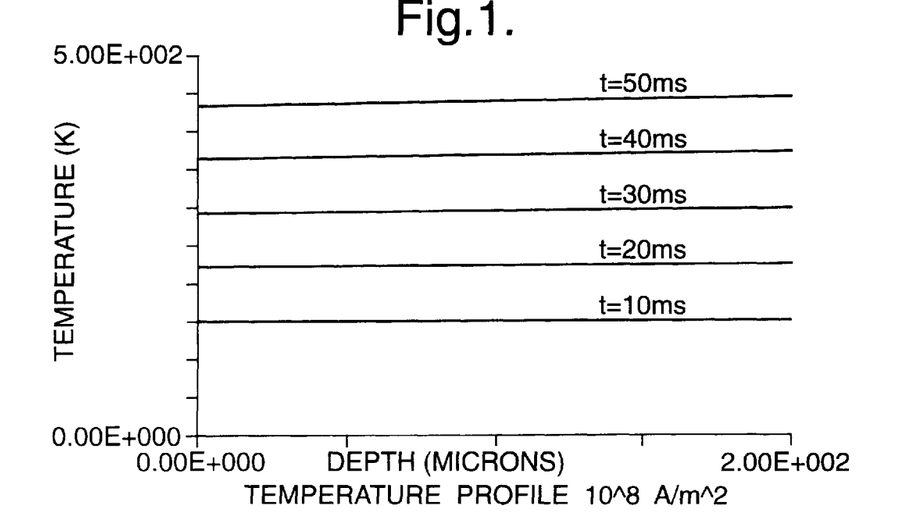
FIGS. 1 and 2 illustrate graphically the temperature profiles across a 200 micron thick film as it varies with time for films carrying $10^8$ and $10^9$ $Am^{-2}$ respectively.
Figure 2:
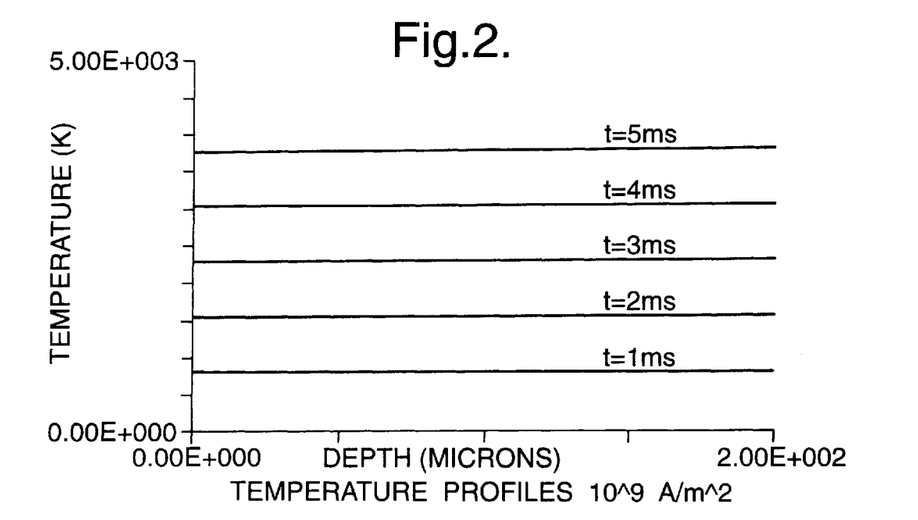

This was solved numerically for current densities of $10^8$ and $10^9$ $Am^{-1}$, The temperature profiles across a 200 micron thick film are shown in FIGS. 1 and 2.

It can be seen that the heat transfer to the (film boiling) nitrogen is much less than the rate of heat generation. Hence for most purposes, the system can be regarded as adiabatic.

Protection against burn-out

Consider an FCL which includes in essence, a high-temperature-superconducting element in series with the line (or in the case of the screened inductor type is inductively coupled to the line current). This element is sufficiently long that, in the normal state, its resistance is high enough to limit the current through it to a low value. In the superconducting state, it can carry a current up to a value Ic without dissipation of power.

In practice, the superconducting element will not be uniform and some parts will have a lower critical current density than others. If a fault occurs, such as a short circuit, the current attempts to exceed Ic, with its rate of rise determined by the system inductance, or by the part of the alternating it is current cycle at which the fault occurs. Initially, it is sufficient the element will become resistive to produce a resistance that limits the current to the critical value.

If, instead of a short circuit, the fault gives rise to a small overload, or the fault current ramps up relatively slowly, then because of the non-uniformity of the element, some of the superconductor will become normal (resistive), but much of it will remain superconducting.

As shown above, the propagation velocity is so low that in a time comparable to the alternating current period, the resistive region does not grow. The resistance simply tracks the current as it rises, and "latches" at its maximum value when the current falls in its cycle.

These effects can be modelled as follows:

Assume that the critical current has a normal distribution:

$$F(J_c) = \frac{1}{\delta\sqrt{\pi}} \exp\left[-\frac{(J_c - J_{c0})^2}{\delta^2}\right]$$

$$R = R_0 \int_0^{I/A} F(J_c) dJ_c$$

Figure 3:
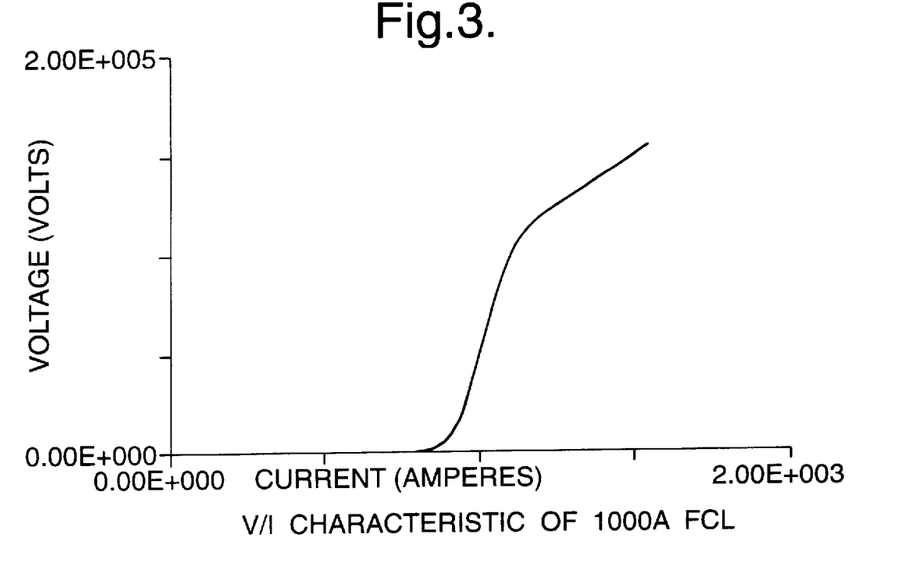
FIG. 3 shows the V/I characteristic for an element with $J_{c0}=10^8$ $A/m^{-2}$, $\delta=10^7$ $A/m^2$, sized to have $R_0=100$ $\Omega$ and $I_{max}=1000$ A.

FIG. 3 shows the V/I characteristic for an element with $J_{c0}=10^8$ $A/m^2$, $\delta=10^7$ $A/m^2$, sized to have $R_0=100$ $\Omega$ and $I_{max}=1000$ A.

If the load resistance is r, and the system voltage is $V_0$ $$I(R + r) = V_0 \sin(2\pi f t + \phi)$$

$$\frac{2V_0 \sin(2\pi f t + \phi)}{I\left[R_0 \mathrm{erf}\left(\frac{IJ_{c0}}{I_{max}\delta} - \frac{J_{c0}}{\delta}\right) + R_0 \mathrm{erf}\left(\frac{J_{c0}}{\delta}\right) + 2r\right]} = 1$$

Figure 4:
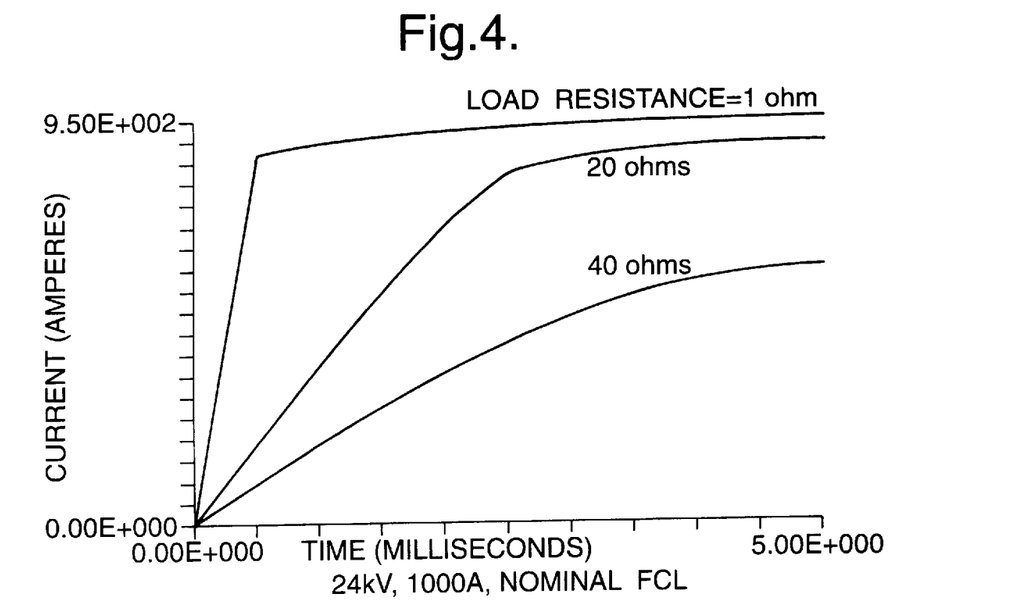
FIG. 4 is a plot of current against time for different load resistances.

This equation can be solved graphically for I. Representative plots of I against time are shown in FIG. 4, for $V_0=24$ kV and for different values of r from 1 Ω ($\approx$short circuit), 20 Ω (moderate overload) to 40 Ω (normal).

It can be seen that the current has been limited to just below the nominal trip value, $I_{max}$.

Figure 5:
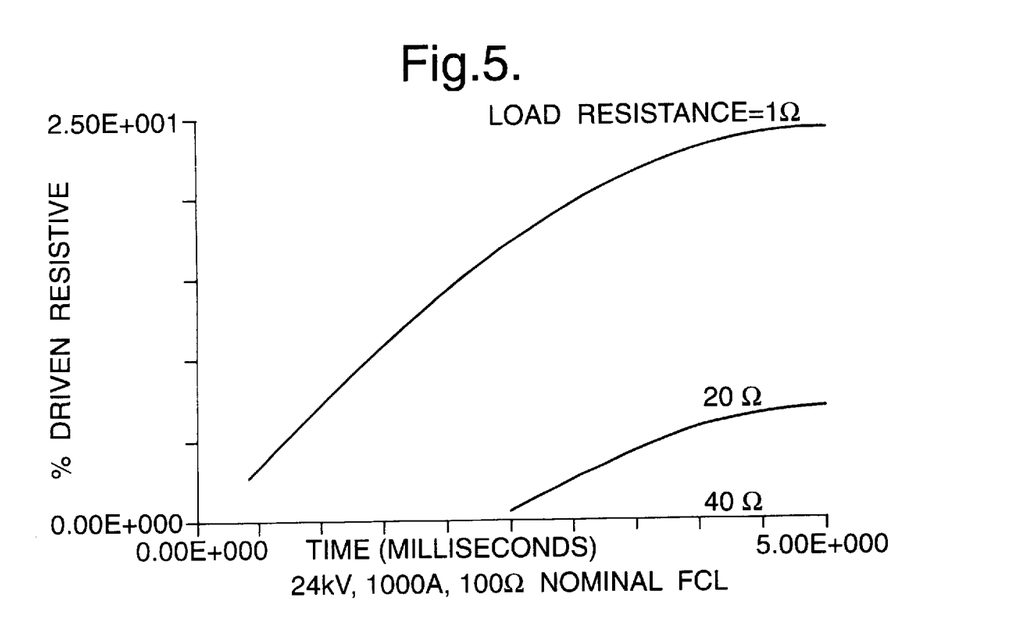
FIG. 5 is a plot similar to FIG. 4 but showing the corresponding resistances.

The corresponding resistances are shown in FIG. 5.

Left to itself, therefore, the FCL element will limit the current to approximately the value of its critical current.

Unfortunately, this will generally be rather large for a resistive conductor, and represent a very high power density.

The time taken to reach the maximum safe temperature is $$\delta t = \frac{(\theta_{max} - \theta_0)\gamma C_p}{\rho J^2/2}$$

This is 140 ms at $J=10^8$ Am$^{-2}$ and 1.4 ms at $J=10^9$ Am$^{-2}$. The implication is that at $10^9$ Am$^{-2}$, the superconductor can be destroyed in less than one cycle of the supply current.

The protection problem is likely to be most severe when the fault results in a very slight overload, so that only a small region only becomes resistive. Because this is so small it is difficult to detect, in the limiting case of a tiny resistive region, we must wait until it has grown before it can be detected.

Resistance Growth

Following Broom and Rhoderick (Brit J Appl Phys, 11, 292, 1960), the rate at which a normal region propagates is given by:

$$v_q = \frac{J/\sqrt{2}}{\gamma C_p}\sqrt{\frac{\rho K}{\theta_c - \theta_0}}$$

This is 0.014 ms$^{-1}$ at $J=10^8$ Am$^{-2}$ and 0.14 ms$^{-1}$ at $J=10^9$ Am$^{-2}$, which is extremely slow compared with the familiar low-temperature superconductors.

During the time to reach the maximum safe temperature, the length of the resistive region, its resistance and the voltage across it grow to:

$$\delta L = \frac{\theta_{max}}{J}\sqrt{\frac{K}{\rho(\theta_c - \theta_0)}}$$

$$\delta R = \frac{\theta_{max}}{JA}\sqrt{\frac{\rho K}{\theta_c - \theta_0}} = \frac{\theta_{max}}{I_{max}}\sqrt{\frac{\rho K}{\theta_c - \theta_0}}$$

$$\delta V = \theta_{max}\sqrt{\frac{\rho K}{\theta_c - \theta_0}}$$

which is about 200 mV.

SUMMARY OF THE INVENTION

In accordance with the present invention, a current limiting device includes a first superconducting element having a critical current density for connection in an electrical circuit. Detecting means in the device detect the onset of a fault condition and means responsive to the detection means vary the relationship between the critical current density and the current carried by the first superconducting element so that the element transforms into a resistive state.

With this invention, we increase the speed with which the first superconducting element transforms into the resistive state under fault conditions so as to prevent the problems of overload and overheating mentioned above.

In one approach, a magnetic field is applied at the onset of a fault condition. Thus, the varying means comprises a magnetic field generator for generating a magnetic field so as to lower the critical current density of the first superconducting element. This magnetic field generator typically comprises a solenoid.

It is possible to detect the onset of a fault condition by sensing the current in the electrical circuit using known techniques, although preferably the fault condition is detected by sensing the onset of resistivity in the superconducting element. In order to detect the onset of resistivity and trigger the magnetic field generator, a resistance of the order of 100 micro-ohms must typically be detected.

The onset of resistivity can be sensed in two ways. In a first alternative this can be done by monitoring the voltage across the first superconducting element and triggering the varying means, e.g. the magnetic field generator, if this voltage exceeds a predetermined threshold. Stray inductance can generate a voltage along the entire length of the first superconducting element that masks any voltage due to the onset of resistivity. This is overcome by measuring the voltage at several points along the first superconducting element, effectively dividing the element into several sections. The potential difference across each section is then measured. The sections are preferably of a predetermined length such that the voltage generated, by stray inductances, across each section is substantially the same. For example if the superconducting element were symmetric then each section would be of an equal length. Assuming no other source of voltages within the element, then the potential difference across each section will be substantially the same. However, if any section of the element were resistive, then the potential difference across that section would be different to that of the other sections, thus allowing a fault condition to be detected. If sections of the required lengths cannot be used, then it is possible to take account of the differing effect of stray inductance across each section using computational analysis that would be understood by people skilled in the art.

In a second alternative, the onset of resistivity can be sensed by injecting a high frequency sampling current into the first superconducting element. The frequency of this sampling or probing current is substantially different from that of the line current. The voltage across the element is monitored, and rectified by a phase sensitive detector coherent with the probing current. The resulting signal does not contain any artifacts from the line current. The component from the stray inductance is constant, and so can easily be subtracted leaving a signal representing the resistance of the element.

If a magnetic field is used to toggle the superconducting element, then the L/R time constant of the field coil will present a limitation on the speed with which the field can be switched on, and consequently on the maximum $J_c$ which can be used, typically in the region of $10^8$ Am$^{-2}$.

In an alternative example, a capacitor is connected in series with the magnetic field generator via a switch, the detection means including means for closing the switch when the fault condition is detected. In this case, the switch could comprise a thyratron or a triggered spark gap. With this arrangement, the superconducting element is driven normal with a brief pulse current by discharging the capacitor.

In a further, preferred example, the varying means includes a second superconducting element in series with the first superconducting element, the second superconducting element having a critical current density less than that of the first superconducting element; and a coil and series connected capacitor combination positioned electrically in parallel across the second superconducting element, the coil being physically positioned about the first and second superconducting elements.

The advantage of this arrangement is that it provides a failsafe mechanism and requires few, if any, active components.

In an alternative approach, the varying means includes a capacitor connected via a switch to the superconducting element and means for closing the switch when the onset of a fault condition is detected whereby the resultant current through the superconducting element exceeds the critical current of the element.

In this approach, instead of varying the critical current density, the current through the element is driven rapidly to a high level to cause transition to the resistive state.

BRIEF DESCRIPTION OF THE DRAWINGS

Some examples of current limiting devices according to the present invention will now be described with reference to the accompanying drawings, in which.

DETAILED DESCRIPTION OF THE EMBODIMENTS

In all the examples to be described, the superconducting element will be shown without associated cryogenics which in general will be required in order to achieve a superconducting condition.

Figure 6:
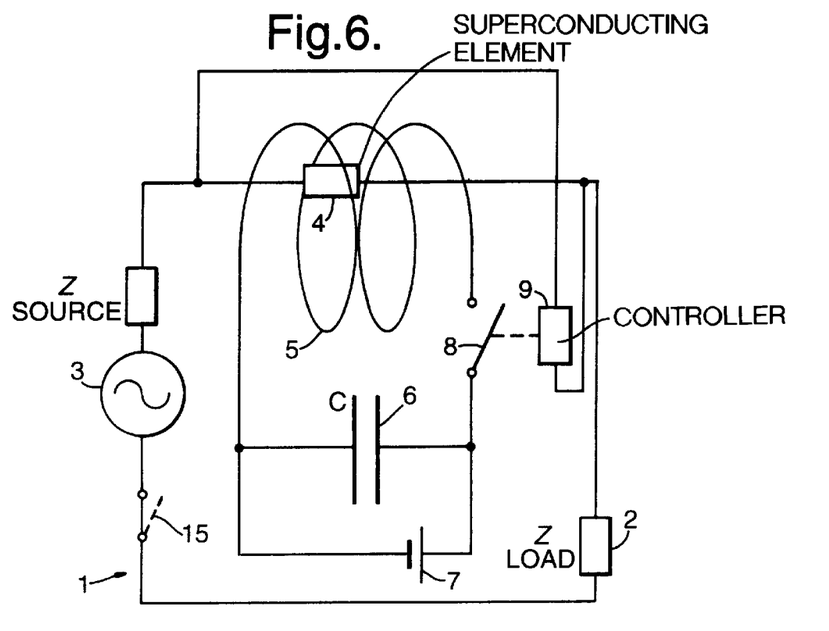
FIGS. 6–8 are circuit diagrams illustrating three different examples of the invention.

In the first example shown in FIG. 6, a circuit 1 to be protected comprises a load (Z) 2 and power source 3 connected in series with a superconducting element 4 of HTc material. Positioned about the superconducting element 4 is a solenoid 5 connected into a separate circuit including a capacitor 6, power source 7 and a switch 8 such as a thyratron.

The onset of a fault is detected using a controller 9 which operates either by sensing the current in the circuit using known techniques, or by sensing the onset of resistivity in the superconducting element. The detection of resistivity also guards against damage caused by refrigeration failure and may be achieved by monitoring the voltage across the superconducting element 4. If this exceeds a predetermined threshold, then a fault is judged to have been detected, causing switch 8 to close.

Figure 17:
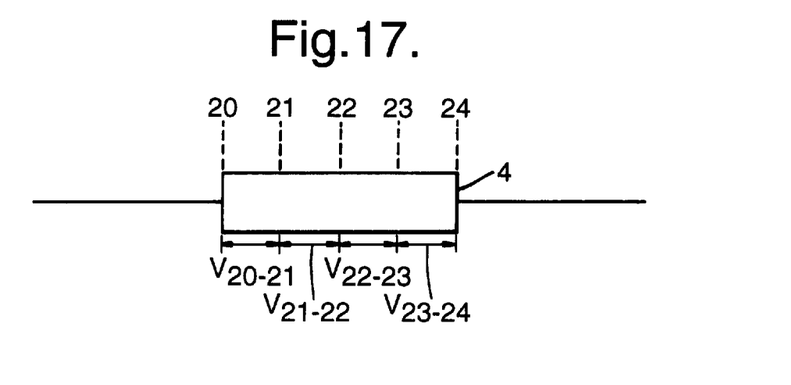
FIG. 17 shows the positions along the superconducting element at which voltages are measured to determine a fault condition; and, FIG. 18 shows an example of an arrangement used for detecting the onset of a voltage in the superconducting element.

This method can be affected by stray inductances in the superconducting element 4 which can generate a large enough voltage along the entire length of the element to mask any voltage due to the onset of resistivity. This is solved by measuring the voltage at several points along the superconducting element, as shown in FIG. 17. By measuring the voltage at points 20–24 the element is effectively divided into four equal sections 20–21, 21–22, 22–23, 23–24 and the potential difference across each of these sections can be calculated. Assuming symmetry of the superconducting element, then the voltage generated by stray inductances in each section of the element would be substantially the same. However, if any section of the element is resistive, then the potential difference in that section is different to that of the other sections.

So in the case shown in FIG. 17, if there is no resistance in the element:

$V_{20-21}=V_{21-22}=V_{22-23}=V_{23-24}$

However, if there is a resistance in section B-C, then there is a potential drop due to the resistance which counteracts the increase in the voltage due to the inductance. In this case:

$V_{20-21}=V_{21-22}=V_{22-23}>V_{23-24}$

Thus by splitting the superconducting element into sections and measuring the potential difference across each section, the effect of stray inductances is accounted for.

Controller 9 measures the voltage at each of the points 20–24 and the potential differences $V_{20-21}$, $V_{21-22}$, $V_{22-23}$, $V_{23-24}$ are calculated. These potential differences are then compared and if it is found that the potential difference of one of these sections is different to those of the other sections then the onset of a fault condition is detected and switch 8 is used to trigger the magnetic field generator.

Figure 18:
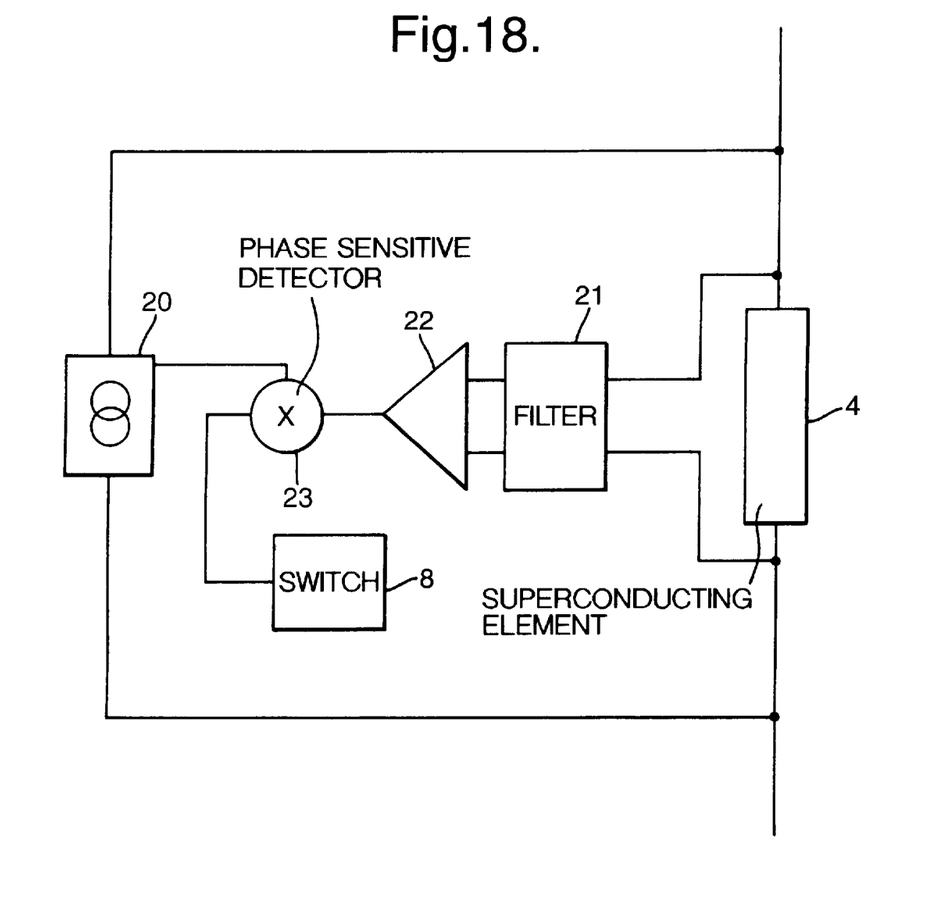

A yet more sensitive method involves injecting an alternating sampling or probing current into the superconducting element 4, where the frequency of the alternating current is substantially different to that of the line current. A typical detector arrangement is shown in FIG. 18, in which the sampling current is supplied by applying a voltage across the superconducting element 4 using an A.C. current source 20. The voltage across the superconducting element 4 is then filtered by a suitable filter 21, amplified by an operational amplifier 22 and then rectified by a phase sensitive detector 23 which is coherent with the probing current. The resulting signal does not contain any artifacts from the line current and the components from the stray inductance will be constant and therefore easily subtracted. The remaining signal represents the resistance of the superconducting element 4 and can be used to activate the switch 8.

To illustrate the operation of this circuit, we consider the design of a superconducting element (FCL) 4 with the following specifications:

| Line voltage | $V_0$ | 24 kV |
|---|---|---|
| Rated normal current | I | 650 A |
| Trip normal current | $I_{max}$ | 1000 A |
| Fault current | $I_f$ | 240 A |

The properties of the superconductor are assumed to be:

| Critical current density | $J_c$ | $10^8$ A/m$^2$ |
|---|---|---|
| Transition width | $\delta$ | $10^7$ A/m$^2$ |

Note that the rated current is chosen to be 3.5 $\delta$ lower than the trip current to ensure that virtually all the element is superconducting at this level.

The cross-sectional area of superconductor required is $10^{-5}$ m$^2$, and this could take the form of, for example, a thick film 100 $\mu$ thick, on a ceramic substrate 100 mm wide. To achieve the required 100 $\Omega$ resistance, the total length would have to be 100 m long. To keep the device 4 reasonably compact, this could take the form of 1000 bars, each 1 m long, connected in series non-inductively, suitably supported and immersed in liquid nitrogen.

Upon a fault occurring, the FCL 4 will initially become resistive to the extent necessary to limit the current to about 1000 A peak-to-peak. The temperature of the resistive regions will rise at a rate of 5300 K/second. When the fault is detected, the protection mechanism is activated by closing switch 8 to make all of the element resistive, and the current drops to 240 A peak-to-peak. If this mechanism takes one full line cycle (20 ms) to detect the fault and become effective, the peak temperature will have risen to 183 K. Thereafter, the temperature will rise at 300 K/second, allowing a second or so to disconnect the supply. This can be achieved by the use of a circuit breaker 15.

The protection mechanism takes the form of applying a magnetic field to reduce the critical current—in this case by a factor of at least 4. This would require a field of strength 0.05 to 0.1 Tesla, which could be supplied by a solenoid coil 5 of inner diameter 1.5 m, outer diameter 1.6 m and length 1.5 m. This coil 5 would generate a field of at least 0.1 T over all the FCL element 4 at a current density of 3 A/mm$^2$. At this field, it would have a stored energy ($LI^2/2$) of $4 \times 10^4$ Joules.

In order to establish the solenoid field quickly, the solenoid 5 is energised by discharging the capacitor 6 from a high voltage, via the switch 8 such as a thyratron or a triggered spark gap.

The values of the coil inductance and capacitance can be chosen to give either a single (or a small number) of field pulses which are long compared to the line cycle, or a rapidly oscillating field which passes through the required value several times during a line cycle. The object is to achieve the field and the peak line current at the same time: A field oscillating at or near the line frequency might be out of phase with it, and not achieve a resistive transition. Examples of these two options are shown below:

| $L_{coil}$ H | $I_{coil}$ A | $R_{coil}$ $\Omega$ | $R_{switch}$ $\Omega$ | C $\mu$F | $V_c$ kV |
|---|---|---|---|---|---|
| 0.08 | 1000 | 0.2 | 0.1 | 1000 | 10 |
| 0.0008 | 10000 | 0.01 | 0.1 | 20 | 100 |

Figure 9:
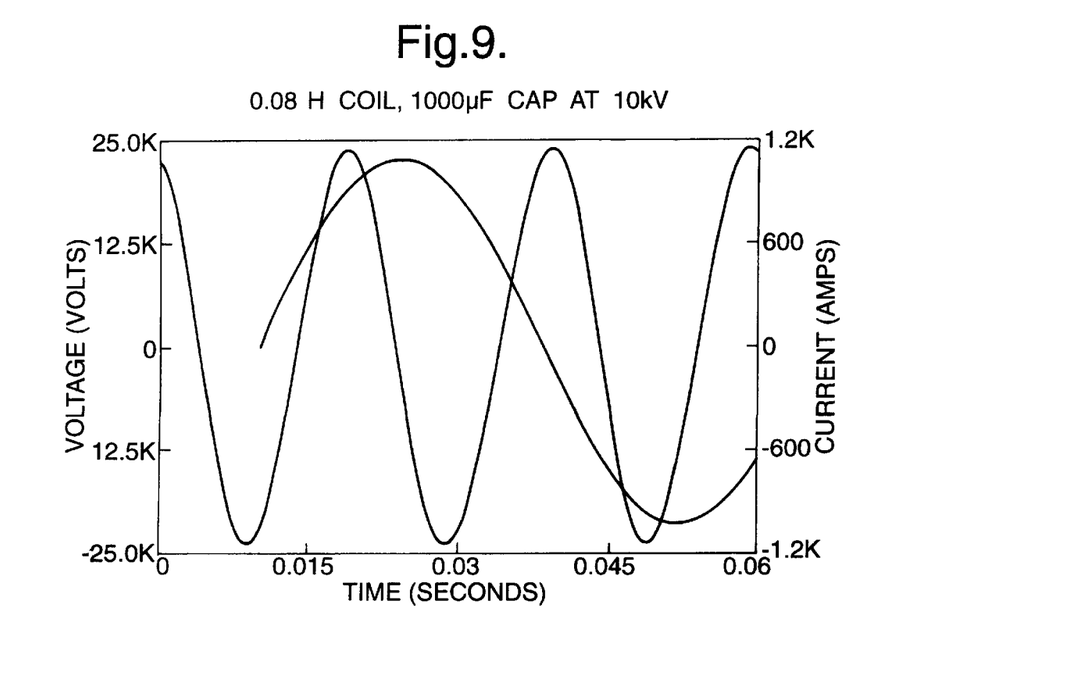
FIGS. 9 and 10 illustrate graphically the variation in voltage with time for two different methods of operating a circuit according to FIG. 6.
Figure 10:
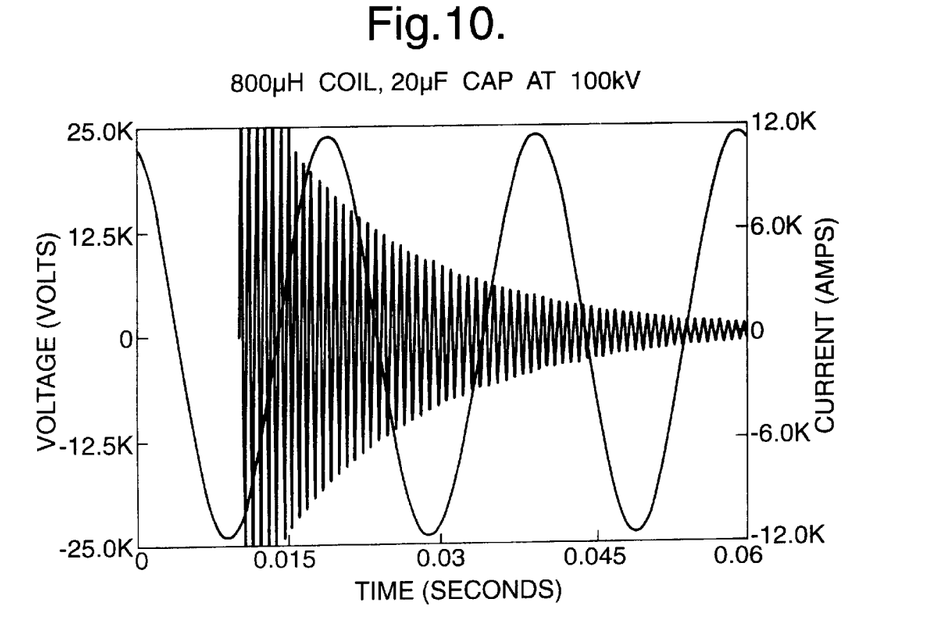

The coil currents are shown in FIGS. 9 and 10 respectively, the switch having been closed at 0.01 seconds, with the line voltage also shown for comparison.

Figure 7:
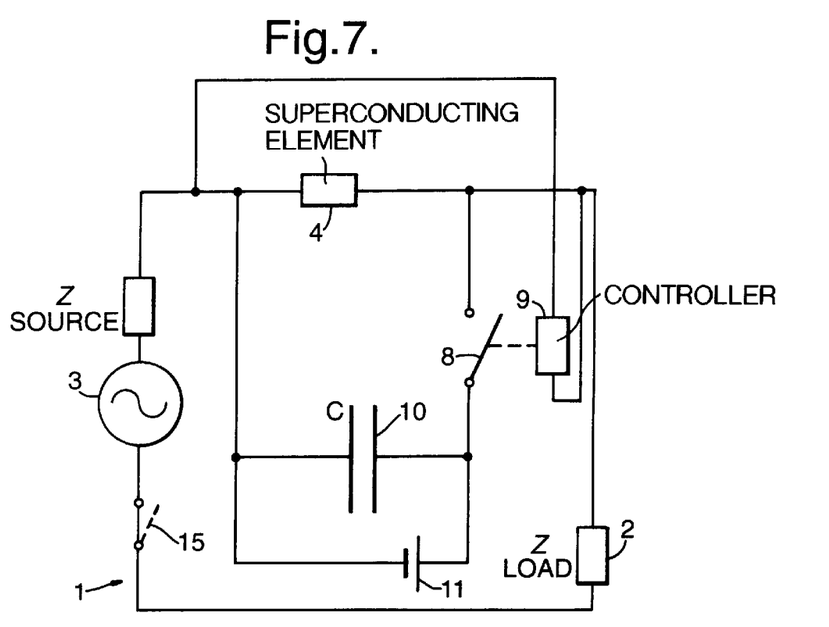

A second example is shown in FIG. 7. In this case, the protection mechanism comprises a capacitor 10 connected in series with the superconducting element 4, and a voltage source 11. Other components carrying the same reference numerals as in FIG. 6 have the same function as those components in FIG. 6. In this example, the capacitor 10 is discharged at the onset of a fault condition to drive a current through the superconducting element 4 to change it into its resistive state.

To do this requires that the capacitor 6 is charged to a voltage such that $V > I_C R$ which for $I_C = 1000$ A and R=100 $\Omega$ requires V>100 kV.
Because the superconducting element 4 might also have the line voltage across it in opposition at the moment when the capacitor is discharged, we need a total of V=124 kV.

Figure 11:
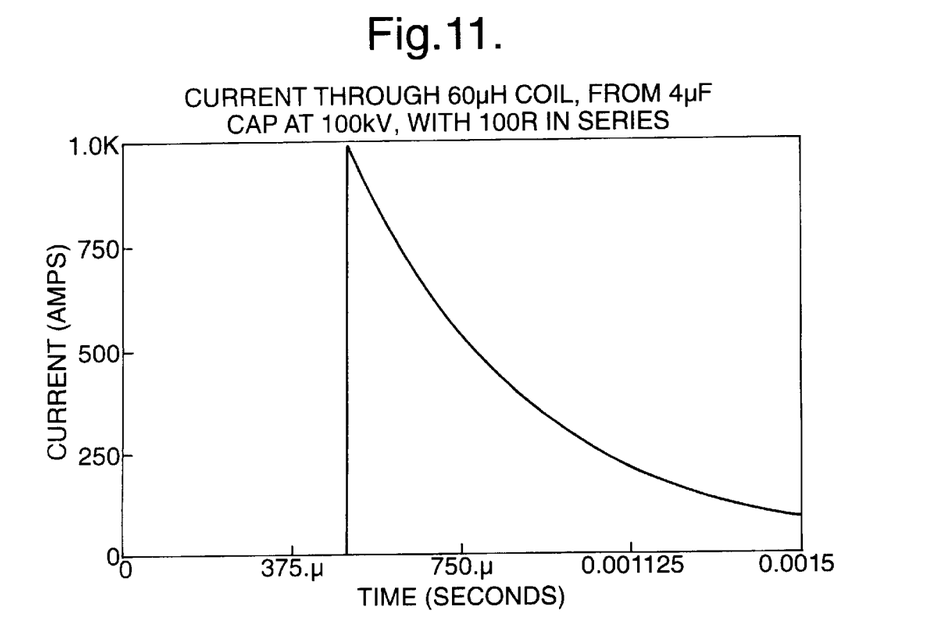
FIG. 11 illustrates graphically the variation of current with time for one method of operating a circuit according to FIG. 7.

If we model the FCL as a 60 $\mu$H inductance with a 100 $\Omega$ series resistor, the current pulse reaches 1000 A if C=4 $\mu$F, as shown in FIG. 11.

The energy involved in the process is only sufficient to raise the temperature of the superconductor by a few degrees.

This system has the advantage that a much smaller high-voltage capacitor is needed, but has the disadvantage that this capacitor and its control equipment must float at line voltage, which adds to the complexity.

Both of the mechanisms described above depend on detecting the beginning of resistive transition, or an over-current, and then triggering the completion of the resistive transition. As such, an active mechanism is required, whose failure might lead to the superconducting element over heating.

Figure 8:
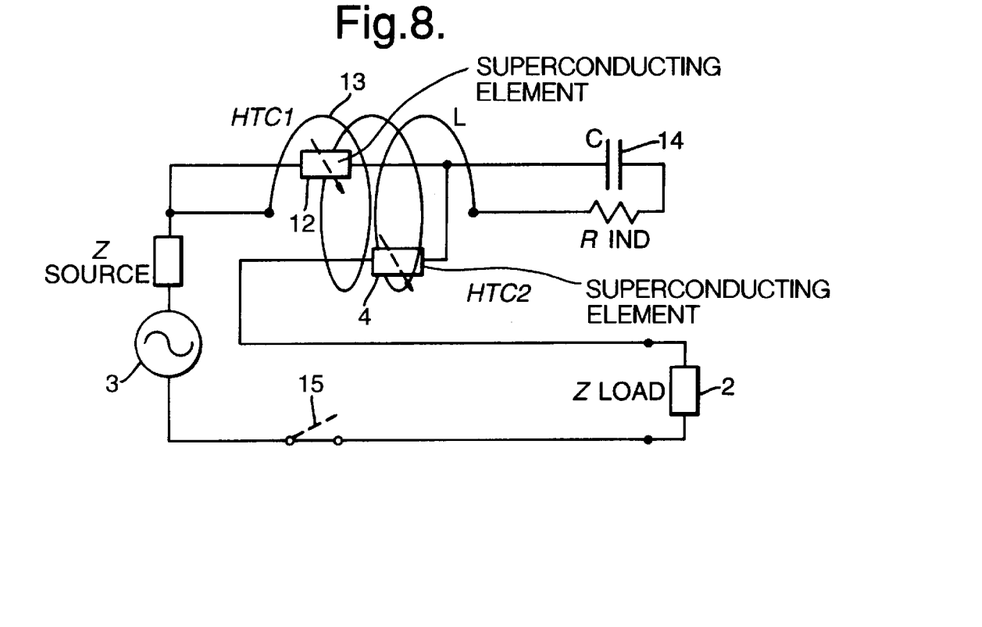

FIG. 8 illustrates a preferred arrangement in which an additional or second superconducting element 12 (HTC1) is provided. In practice, the superconducting element 12 may form part of a larger superconducting element, the other part of which forms the superconducting element 4 (HTC2). The designation of "HTC" refers to a preferred embodiment in which the superconducting element is a high temperature superconducting element operable at a critical temperature of liquid nitrogen or above. The superconducting element 12 is connected in series with the superconducting element 4 and in parallel with a coil 13 and capacitor 14. The coil 13 surrounds both superconducting elements 4,12. The critical current density of the superconducting element 12 is chosen to be slightly lower than the critical current density of the superconducting element 4. In addition, the superconducting element 12 has a normal state resistance which need not be greater than $V_0/I_C$. The superconducting element 4 will, when resistive, then provide the majority of the resistance.

When a fault occurs, HTC1 12 becomes resistive first, and the voltage across it drives current into the magnet coil 13. The series resonant capacitor 14 ensures that the coil 13 presents a low impedance (thereby allowing a substantial coil current to build up even when the fault is an overload rather than a short circuit and HTC1 does not develop its full resistance initially) and also that the coil current (and hence its magnetic field) is in phase with the current in the superconducting elements.

The effect of the magnetic field is to reduce the critical current and so cause HTC2 4 to become resistive. This in turn limits the fault current.

FIGS. 12 to 16 illustrate the behaviour that might be expected from this sort of mechanism. The coil 13 has an inductance of 0.08 H and produces a field of 0.1 T at 1000 A. Capacitor 14 has a value of 127 $\mu$F and the series resistance of the coil 13, $R_{ind}$, is 0.2 $\Omega$.

Figure 12:
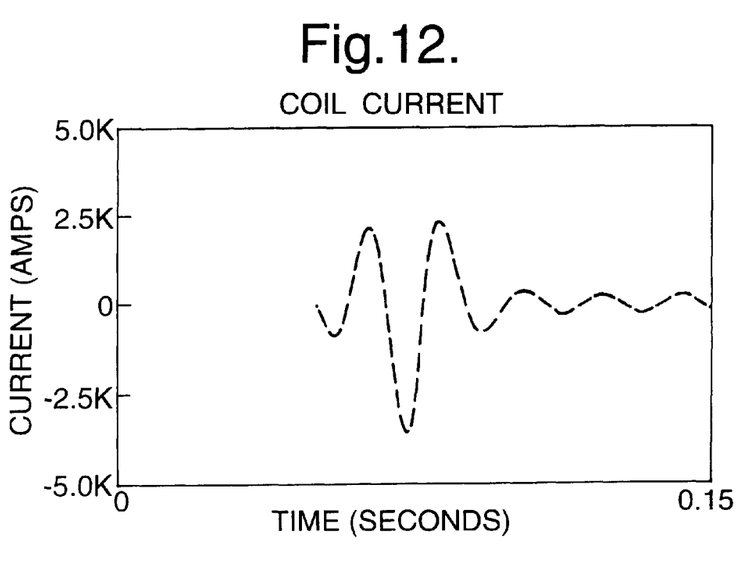
FIGS. 12 and 13 show the coil current and total system current respectively for the case of a short-circuit fault in the circuit of FIG. 8.
Figure 13:
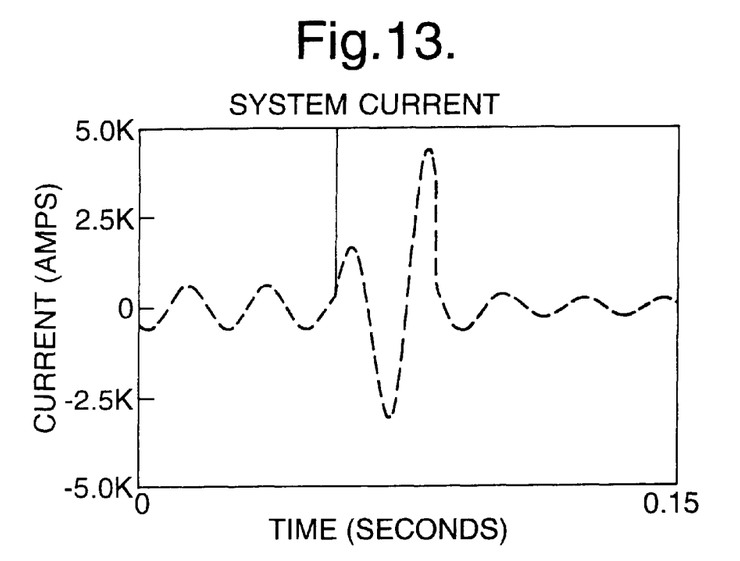

FIGS. 12 and 13 show the coil current and total system current respectively for the case of a short-circuit fault. The short-circuit occurs at 50 msec. HTC1 12 becomes resistive with a resistance of 25 $\Omega$ and the coil current rises rapidly. HTC2 4 is assumed to become fully resistive (100 $\Omega$) at 75 msec causing the current to fall to its limited value.

Figure 14:
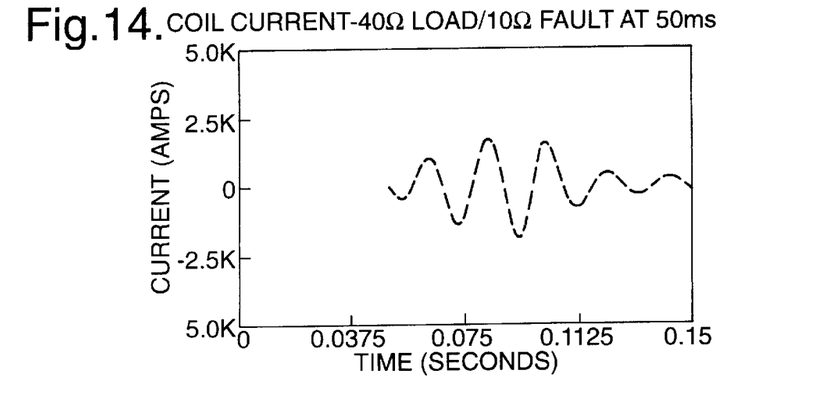
FIGS. 14–16 show the coil current in the circuit of FIG. 8 under various overload conditions.
Figure 15:
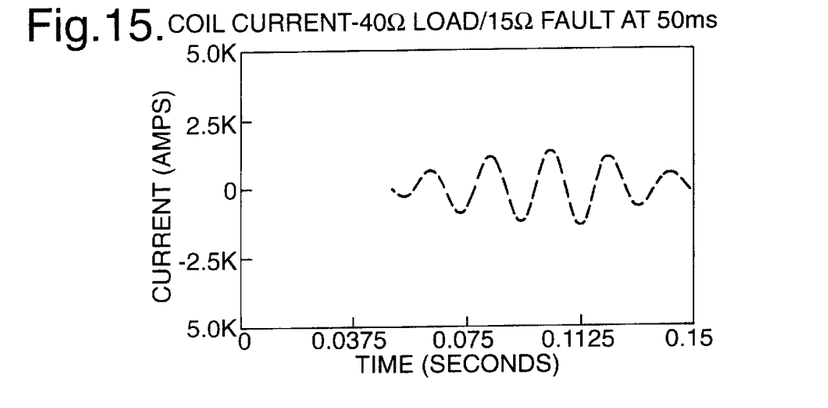
Figure 16:
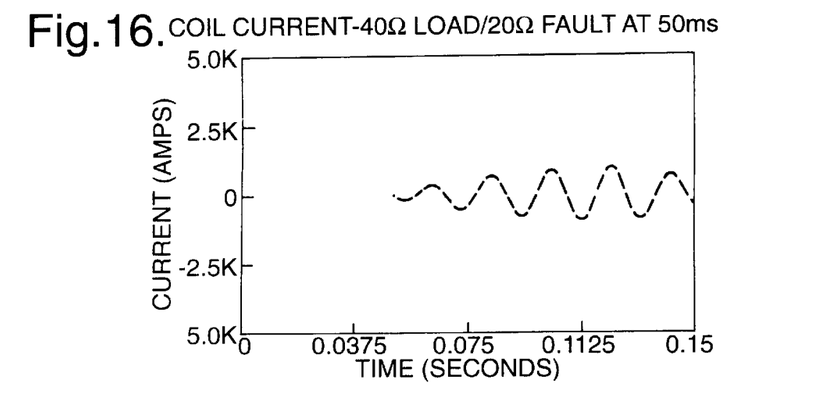

FIGS. 14, 15 and 16 show the coil current under various overload conditions.

In each case, HTC1 12 becomes resistive initially only to the extent necessary to limit the current to $I_C$, i.e. $R_{HTC1} = V_0/I_C - R_{Load}$.

The voltage available to charge the coil 13 is therefore $V_0 - I_C R_{Load}$. The main effect of small overloads, as compared with a short circuit, is to increase the delay before the whole system becomes resistive. The low impedance of the series-resonant circuit ensures that the coil gets a substantial current so long as $R_{HTC1} \geq R_{ind}$.

The possibility of cooling the coil 13 to liquid nitrogen temperature to reduce $R_{ind}$ should not be ignored.

We claim:

1. A current limiting device, comprising:
   a first superconducting element for connection in an electrical circuit to carry electrical current, said superconducting element having a critical current density;
   means for detecting the onset of a fault condition; and
   means responsive to said detection means for varying the relationship between the critical current density and the current carried by said first superconducting element so that said first superconducting element transforms from a superconducting state into a resistive state,
   wherein said varying means includes a second superconducting element in series with said first superconducting element, said second superconducting element having a critical current density less than the critical current density of said first superconducting element, and a coil and series connected capacitor combination positioned electrically in parallel across said second superconducting element, said coil surrounding at least a portion of said first and second superconducting elements.

2. A device according to claim 1, wherein current flows through said first superconducting element at a line frequency and wherein said coil and series connected capacitor are substantially resonant at the line frequency.

3. A current limiting device, comprising:
   a high temperature superconducting element operable at a critical temperature of liquid nitrogen or above, and connected in an electrical circuit to carry electrical current, said high temperature superconducting element having a critical current density;
   a controller to detect the onset of a fault condition; and
   a switch and a capacitor which are responsive to said controller to vary the relationship between the critical current density and the current carried by said high temperature superconducting element by increasing the current so that said high temperature superconducting element transforms from a superconducting state into a resistive state.

4. A current limiting device, comprising:
   a superconducting element for connection in an electrical circuit to carry electrical current, said superconducting element having a critical current density;
   means for detecting the onset of a fault condition; and
   means responsive to said detection means for varying the relationship between the critical current density and the current carried by said superconducting element so that said superconducting element transforms from a superconducting state into a resistive state,
   wherein said detection means comprises a sampling current source for injecting a sampling current into said superconducting element, and means for determining the resistance of said superconducting element by monitoring the response of said superconducting element to the passage of the sampling current, said detection means triggering said varying means when the monitored response indicates the onset of a fault condition.

5. A current limiting device, comprising:
   a superconducting element for connection in an electrical circuit to carry electrical current, said superconducting element having a critical current density;
   a controller to detect the onset of a fault condition; and
   a switch, which is responsive to said controller, to vary the relationship between the critical current density and the current carried by said superconducting element so that said superconducting element transforms from a superconducting state into a resistive state,
   wherein said controller comprises a sampling current source for injecting a sampling current into said superconducting element, and means for determining the resistance of said superconducting element by monitoring the response of said superconducting element to the passage of the sampling current, said controller triggering said switch when the monitored response indicates the onset of a fault condition.

6. A current limiting device, comprising:
   a high temperature superconducting element operable at a critical temperature of liquid nitrogen or above, and connected in an electrical circuit to carry electrical current, said superconducting element having a critical current density;
   a controller to detect the onset of a fault condition; and
   a switch unit responsive to said controller to vary the relationship between the critical current density and the current carried by said high temperature superconducting element so that said superconducting element transforms from a superconducting state into a resistive state,
   wherein said switch unit includes a capacitor connected via a switch to said superconducting element and means for closing the switch when the onset of a fault condition is detected such that the resultant current density through said superconducting element exceeds the critical current density of said superconducting element.

7. A current limiting device, comprising:
   a high temperature superconducting element operable at a critical temperature of liquid nitrogen or above, and connected in an electrical circuit to carry electrical current, said superconducting element having a critical current density;

a controller to detect the onset of a fault condition; and a switch, which is responsive to said controller, to vary the relationship between the critical current density and the current carried by said superconducting element so that said superconducting element transforms from a superconducting state into a resistive state, wherein said controller comprises a sampling current source for injecting a sampling current into said superconducting element, and means for determining the resistance of said superconducting element by monitoring the response of said superconducting element to the passage of the sampling current, said controller triggering said switch when the monitored response indicates the onset of a fault condition.

8. A current limiting device, comprising:

a superconducting element for connection in an electrical circuit to carry electrical current, said superconducting element having a critical current density;

means for detecting the onset of a fault condition; and means responsive to said detection means for varying the relationship between the critical current density and the current carried by said superconducting element by increasing the current so that said superconducting element transforms from a superconducting state into a resistive state, wherein said detection means comprises a voltage monitor for monitoring the voltage across a number of sections of said superconducting element, and for triggering said varying means if said monitored voltage across one of said sections exceeds a predetermined threshold and differs by more than a predetermined amount from the voltage across the other sections.

9. A device according to claim 8, wherein said sections have substantially the same length.

10. A current limiting device, comprising:

a superconducting element for connection in an electrical circuit to carry electrical current, said superconducting element having a critical current density;

means for detecting the onset of a fault condition; and means responsive to said detection means for varying the relationship between the critical current density and the current carried by said superconducting element by increasing the current so that said superconducting element transforms from a superconducting state into a resistive state, wherein said detection means comprises a sampling current source for injecting a sampling current into said superconducting element, and means for determining the resistance of said superconducting element by monitoring the responses of said superconducting element to the passage of the sampling current, said detection means triggering said varying means when the monitoring response indicates the onset of a fault condition.

* * * * *